No. 756,176.                                                                                      Patented March 29, 1904.

UNITED STATES PATENT OFFICE.

ACHILLE MEYGRET, OF PARIS, FRANCE.

PROTECTIVE SHEATH OR ENVELOP FOR STORAGE-BATTERY PLATES.

SPECIFICATION forming part of Letters Patent No. 756,176, dated March 29, 1904.

Original application filed June 29, 1903, Serial No. 163,638. Divided and this application filed July 27, 1903. Serial No. 167,244. (No model.)

*To all whom it may concern:*

Be it known that I, ACHILLE MEYGRET, a citizen of the Republic of France, residing at Paris, in the Department of the Seine, France, have invented a certain new and useful Improvement in a Protective Sheath or Envelop for Storage-Battery Plates, of which the following is a specification.

It is well known that the life of a storage-battery plate is very much shortened owing to the active matter or material thereon becoming loosened and detaching itself or falling off or dropping from the metal plate or grid, such loosening arising by reason of the active matter or material dilating and contracting under the repeated action of charging and discharging the battery, and inasmuch as the elasticity of the active matter or material is very limited the dilation and contraction thereof loosens the same, causing it to become detached and drop or fall off, thus deteriorating or destroying the plate as a whole to an extent where it will not be capable of performing the functions required.

The primary object of the invention is to incase or cover the plate or grid, with the active material thereon, with a sheath or envelop, by which the active material is protected against the effects of charging and discharging the battery as regards the loosening, detaching, and dropping off of the active matter or material and to furnish a sheath or envelop of an elastic nature and which will not be attacked by the electrolyte, thus preventing the electrolyte from coming in direct contact with the metal of the plate or grid, thus increasing or prolonging the life of the plate or grid both as to retaining the active matter or material thereon and preventing the electrolyte from attacking the metal.

The invention consists in the protective sheath or envelop for storage-battery plates hereinafter described and claimed.

The protective covering or sheath of the invention is obtained by dipping the plate or grid, after the active material has been applied thereto, in a bath or solution consisting of castor-oil, essence of turpentine, octonitric cellulose, and ordinary nitrate of cellulose of commerce, the tetra nitrate of cellulose being preferred. This bath or solution when the plate or grid is dipped thereinto forms a close-fitting coating or sheath, which draws and presses the active matter or material firmly against the supporting surfaces or faces of the metal portion of the plate or grid and positively and effectively prevents the detaching, falling off, or dropping away from the plate or grid of the active matter or material. This coating envelop or sheath, formed of the ingredients named in proper proportion, is of an elastic nature and will not be attacked by the electrolyte, preventing the electrolyte from coming in direct contact with the metal of the plate or grid, which will prolong the life of the battery-plate as a whole. The electrolyte, however, must reach the active material, and for this purpose the envelop or sheath is to be rendered porous or given porosity, either by mechanical means or chemically, so as not to destroy the envelop or sheath as a protector in keeping the active matter or material on the supporting surfaces or faces of the plate or grid in case of loosening, and yet allow of the requisite access to the active matter or material for charging and discharging purposes, and for mechanically giving the required porosity to the envelop or sheath the plate can be passed under a cylinder or between cylinders that will perforate the envelop or sheath without destroying its continuity or by cutting a series of fine gashes in the envelop or sheath to furnish a fine slit for access of the electrolyte to the active material without presenting the metal of the plate or grid to the direct contact of the electrolyte.

The envelop or sheath of the invention is applicable to and is adapted for use with plates of any form or style of storage-battery plates or electrodes. It is elastic, so as to give and take with the expansion and contraction of the active material without destroying its retaining properties as an envelop or sheath. It acts as a binder to prevent the active matter or material from detaching itself and dropping off or falling from the plate or grid. It can be used with storage-battery plates or electrodes of large or small size, as may be demanded or required for commercial purposes. It enables a thin metal plate or grid with active matter or material thereon to be used with the assurance that the active matter or material will be retained on the plate, which can thus be made very light, and storage-battery plates or electrodes protected by the porous envelop or sheath of this invention will be conserved or kept in working condition for a long period of time and will greatly increase the longevity of the plate as to charging and discharging, thus making a saving in this respect. The protection to the metal of the grid from the sheath or envelop arises from the fact that the elastic nature of the sheath or envelop draws the active matter or material close to the grid, making so snug a fit between the active material and the grid as to prevent the electrolyte from entering beneath the active material and attacking the metal of the grid.

What I regard as new, and desire to secure by Letters Patent, is—

1. A coating or sheath for retaining the active material on the plate of a storage battery, said coating or sheath consisting of a mixture of castor-oil, essence of turpentine, and nitrates of cellulose, substantially as described.

2. A bath for covering the plates of storage batteries and forming a coating or sheath for retaining the active material on the plate, said bath consisting of a solution of castor-oil, essence of turpentine, and nitrates of cellulose, substantially as described.

ACHILLE MEYGRET.

Witnesses:
CHAS. H. WHITING,
H. R. WALTMANN.